(12) United States Patent
Schneider

(10) Patent No.: US 6,625,848 B1
(45) Date of Patent: Sep. 30, 2003

(54) STRIKING IMPLEMENT WITH IMPROVED ENERGY STORAGE AND VIBRATION DAMPENING PROPERTIES

(76) Inventor: Terry L. Schneider, 3702 15th Avenue SE., Puyallup, WA (US) 98372

( * ) Notice: Subject to any disclaimer, the term of this patent is extended or adjusted under 35 U.S.C. 154(b) by 140 days.

(21) Appl. No.: 09/680,556

(22) Filed: Oct. 5, 2000

Related U.S. Application Data

(60) Provisional application No. 60/158,807, filed on Oct. 12, 1999.

(51) Int. Cl.$^7$ .............................. B25G 1/01; A63B 59/00
(52) U.S. Cl. ........................... 16/436; 81/489; 473/289; 473/316; 473/520
(58) Field of Search ................ 16/436; 81/22, 81/177.1, 489, 900; 74/543, 551.1; 473/289, 282, 287, 296, 316, 520, 564

(56) References Cited

U.S. PATENT DOCUMENTS

| | | | | |
|---|---|---|---|---|
| 2,809,684 A | * | 10/1957 | Lyon | 81/20 |
| 4,266,588 A | * | 5/1981 | Tudisco | 81/22 |
| 5,029,496 A | * | 7/1991 | Catania | 81/22 |
| 5,297,791 A | * | 3/1994 | Negishi | 273/80 R |
| 5,614,305 A | | 3/1997 | Paine et al. | |
| 5,704,259 A | * | 1/1998 | Riehle | 81/22 |
| 5,772,541 A | * | 6/1998 | Buiatti | 473/564 |
| 6,173,477 B1 | * | 1/2001 | Kikutani et al. | 16/436 |
| 6,311,369 B1 | * | 11/2001 | Ryu | 16/436 |

* cited by examiner

Primary Examiner—Anthony Knight
Assistant Examiner—Doug Hutton
(74) Attorney, Agent, or Firm—Merchant & Gould PC; John W. Branch

(57) ABSTRACT

Striking implements that have an improved ability to store and quickly release significant energy during flexure and at the same time have significant vibration damping capability to impart a desired "feel" to the user. A shape memory alloy element is inserted at a specific flex point along the length of the sports or utility striking implement to permit a desired degree of flexure, with an enhanced leverage effect, and to absorb undesired vibrational energy. Typical sports or utility striking implements utilizing the invention include, but are not limited to, golf clubs, hockey sticks, polo clubs, tennis rackets, racket ball rackets, baseball bats, pole vaults, rowing oars, picks, axes, hammers, and the like.

43 Claims, 10 Drawing Sheets

STRIKING IMPLEMENT WITH IMPROVED ENERGY STORAGE AND VIBRATION DAMPENING PROPERTIES

RELATED PATENT APPLICATIONS

This application seeks priority from U.S. provisional patent application Ser. No. 60/158,807 filed Oct. 12, 1999.

FIELD OF INVENTION

The invention relates to improved striking implements for sports or utility applications used to strike an object. More particularly, the striking implements of the present invention utilize the properties of shape memory alloys (SMA) that exhibit a stress-induced phase change to achieve high levels of elastic, reversible strain without permanent deformation in order to store and release significant levels of energy.

BACKGROUND

In recent years, there has been a growing demand among consumers for opportunities to participate in a variety of sports, both as a means of recreation and to improve general health. At the same time, there have been several breakthroughs in technology, some of which have been applied to the implements used in sports, and in some utilitarian tools. For example, in the sports implement field, while early golf clubs had shafts made of wood or wood composite, and club heads made of steel, these have been superseded by modem golf clubs with carbon-fiber reinforced shafts and titanium alloy heads. Moreover, sports implements have also been modified for form, to the extent that form dictates function and to the extent allowed by sports regulatory bodies.

Despite the significant advances in technology applied to striking implements, be they sports implements or striking tools, there exists the need to increase the ability of striking implements to store and release significant levels of energy with less effort exerted by the user. Additionally, there yet exists a need for implements that are able to absorb forces generated by an impact, while also protecting the user, and in the case of sports implements providing a pleasing "feel". In particular, for example, it is well-known that tennis players sometimes develop "tennis elbow" as a result of forces transmitted from the tennis racquet to the elbow, when the racquet strikes a ball with high impact. The challenge for technology is to reduce the amount of force transmitted to the user, while maintaining a sufficient "feel" so that the user is able to exercise control, obtain instantaneous feedback and derive pleasure from playing the game. Moreover, the technology should be such that the implement, whether a tool (hammer, axe, etc.), or sports implement (such as golf club, hockey stick, tennis racquet, and the like), should be lightweight and retain its utility while at the same time having enhanced energy transfer, user control, and reduced transmission of impact forces to the user.

SUMMARY OF THE INVENTION

The present invention relates to the use of reversible strain properties of shape memory alloys at the flex point of a sports or utility striking implement. The use of a shape memory alloy element at the flex point of a striking implement yields a device capable of storing and releasing significantly higher levels of energy from the implement to an object, relative to conventional constructions, thereby improving the implement's efficiency to perform work. The present invention also makes use of the vibration dampening property of the shape memory alloy, by itself and in combination with other materials that have efficient vibration dampening characteristics.

Embodiments of the invention are described in more particularity below. In summary, the invention modifies the shaft of a striking implement so that it comprises at least two shaft portions, with a shape memory alloy element bridging a gap between the two shaft portions, such that the element is able to flex when the implement strikes an object. In certain embodiments, to prevent over flexure and permanent deformation of the shape memory alloy element, the shaft is equipped with a stop (that may be a part of the shaft) that limits the degree of deformation of the element when the implement strikes an object. In other embodiments, a stop mechanism is not needed. In general, the shape memory alloy element is coaxially aligned with the shaft sections, and is affixed to each of the shaft sections by a range of optional attachment mechanisms such as polymeric plugs, couplings, and tapering of shaft ends to grip or clamp onto the element.

The invention provides several advantages, primary among these is the improved transfer of impact force from the implement to the object with less effort, due to a lever effect created at the flex point within the shape memory alloy by the stress-induced phase transformation of the alloy at this point of flexure allowing for large strains with minimal applied stress. The advantage of vibration dampening is also possible due to the shape memory alloy's hysteresis during unloading of stored energy as well as when surrounded by other materials having vibration dampening properties. Fixing the location of the flex point at a specific point along the shaft or implement with the shape memory alloy also provides more consistent performance of the device.

BRIEF DESCRIPTION OF THE DRAWINGS

The foregoing aspects and many of the attendant advantages of this invention will become more readily appreciated as the same becomes better understood by reference to the accompanying drawings, wherein.

DETAILED DESCRIPTION OF THE PREFERRED EMBODIMENT

Figure 1A:
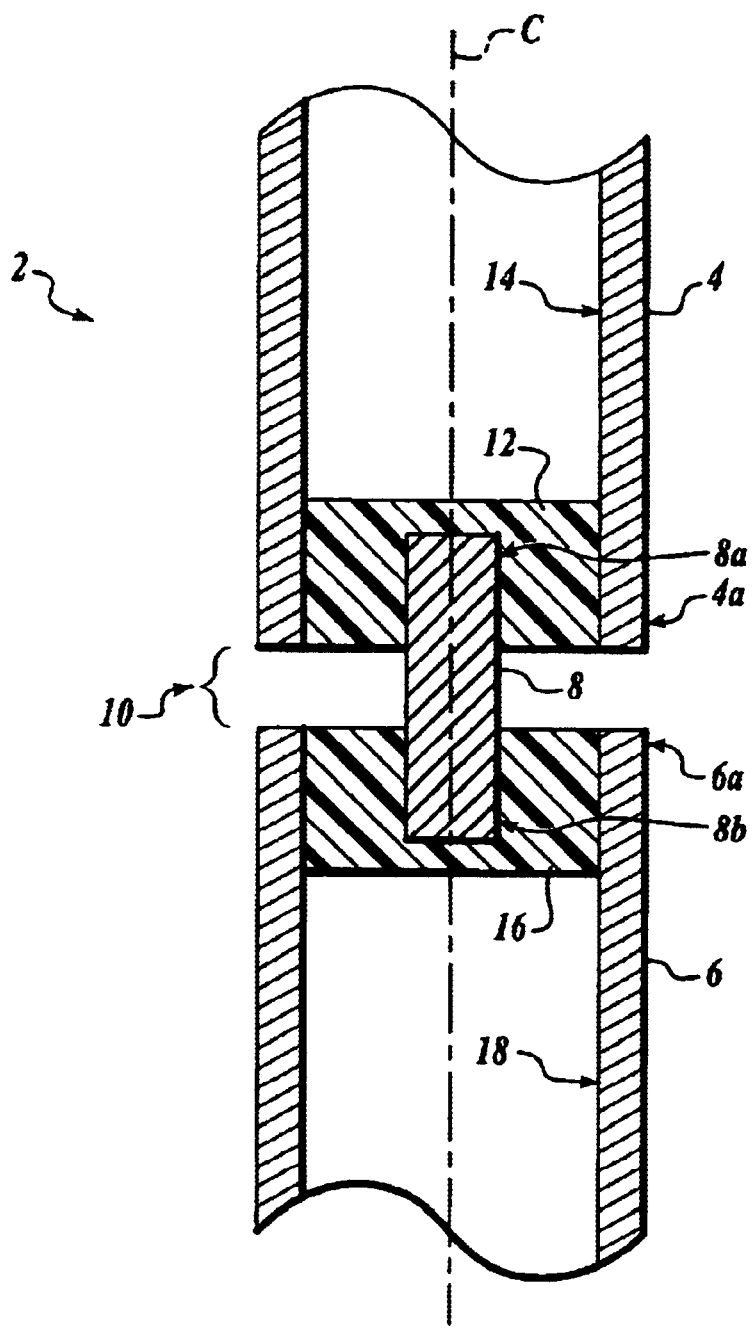
FIG. 1A illustrates a preferred embodiment of the present invention showing a solid SMA rod coaxial with the longitudinal axis of the shaft directly joining upper and lower shaft sections of the striking implement.

The present invention relates to the use of shape memory alloys in striking implements, especially as elements or inserts coaxial with a shaft of the implement. Examples of such striking implements are shown in FIGS. 7A–G, and include, but are not limited to golf clubs, baseball bats, polo clubs, tennis racquets, squash racquets, racquet ball racquets, ice hockey sticks, vaulting poles, picks, hammers, and axes. Briefly, the alloy element provides a mechanism to increase the ability for storage and release of energy in the implement and achieve vibration dampening at the juncture where it is located intermediate upper and lower shaft sections. During flexure of the striking implement, the SMA element would preferably be stressed at the mid-point between the upper and lower rigid sections of the implement to transform the SMA from its austenitic state to its lower modulus martensitic state and induce the "superelastic" condition of the SMA to store and release large amounts of energy. The degree of flexure is controlled by the length, diameter or wall thickness of the SMA, when it is in tubular form. In the preferred embodiments of the present invention, the modulus (stiffness) of the shape memory alloy and hence its degree of flexure, is primarily controlled by the diameter and heat treatment of the rod form or wall thickness, diameter and heat treatment of the tubular form of the alloy. The elemental composition of the alloy employed in the device may also influence the stiffness and resulting degree of flexure. In other embodiments, adjacent ends of the lower and upper shaft sections are separated by a predetermined gap distance so that during flexure of the striking implement the degree of flexure is limited to prevent straining of the SMA to such an extent that there is permanent deformation of the SMA. During flexure, the outer diameters of adjacent ends of the lower and upper shaft sections at this gap rotate towards each other and make contact to resist further flexure of the striking implement. Once in this state, upon release of the stress, the SMA would reversibly return to its unstressed, austenitic form with the release of the stored energy in the form of work. The striking implement as a total structure would flex back to its original shape with greater force due to the properties of the SMA to store and release large amounts of energy and due to a lever effect at its point of flexure. During striking of an object, the SMA would also dampen a level of vibrational energy as a result of the alloy's hysteresis (energy dissipation property) reducing shock and imparting a desired "feel" to the user, often an important property in sports implements. To further reduce vibrational shock, a flexible joint unit that includes an organic polymer-reinforced composite material may be utilized, such as KEVLAR®-reinforced epoxy, that has a higher specific dampening capacity than carbon fiber-reinforced composites or metallic materials typically used for constructing the shaft sections of the striking implement FIG. 8 illustrates an exemplary chart for a stress strain curve showing the properties of superelasticity and vibration dampening for an exemplary shape memory alloy, wherein energy is stored and then released during transition from the austenitic to the martensitic phase.

According to the invention, the shaft or handle of a striking implement is typically made up of the following parts: a lower, usually rigid shaft section and an upper, also usually rigid shaft section with a SMA joining element between the two sections. In accordance with the invention, these sections may be hollow ("tubular") or may be solid. The two shaft sections are joined by a third section defining the flex point of the implement shaft to thereby form a single, continuous shaft. The joining element is a shape memory alloy (SMA) element that is coaxial with the longitudinal axis of the shaft. The SMA element would preferably (but not necessarily) be in the following preferred forms: a solid rod or wire, or a multiple of smaller rods or wires, or a hollow tube of any of a variety of cross-sectional shapes such as circular, oval hexagonal, etc., in a plan at right angles to its longitudinal axis. Each element's diameter and/or wall thickness (if hollow) and heat treatment is dependent on the desired degree of flexure which is in turn dictated by the desired performance of the shaft or striking implement.

The shape memory alloy would preferably be initially in the stress-free austenitic state over the range of services temperatures of the striking implement (usually in the range −30 to 130° F.) to utilize both the shape memory effect (reversible strain properties) and vibration dampening properties when cycled by stress-inducement between the austenitic and martensitic states. To utilize only the vibration dampening properties of the alloy in this design, the alloy should preferably be in the martensitic state over the service temperature range of the striking implement.

The SMA element joining the lower and upper shaft sections would be located at a preselected point along the striking implement's longitudinal axis to define the flex point location of the total striking implement to impart desired characteristics. In some embodiments, the invention provides a "flexible joint unit" (FJU) to hold the SMA element in place and provide desired flex characteristics. The SMA element typically extends longitudinally along a short portion of the central axis of the shaft, and extends some distance below the lower end of the lower shaft section and preferably the same distance above the upper end of the upper shaft section.

The upper and lower sections of the shaft may be metallic, wood, or fiber-reinforced composite in construction. The flexible joint unit, FJU, is preferably a continuous fiber-reinforced composite or chopped fiber-reinforced polymeric composite or integrally molded thermoplastic or thermosetting material having the desired degree of flexibility for each application, but is not limited to composite materials. Upper and lower rigid shaft sections are often metallic, and often steel, titanium or aluminum although other metals are possible. For some implements, upper and lower shaft sections are fiber-reinforced composite, preferably continuous fiber-reinforced matrix composite materials that are rigid after cure or processing into a shape. The fiber reinforcement is typically glass, carbon, graphite, ceramic, metal and/or organic polymeric, e.g. aramid, polyethylene, etc., but is not limited to these materials. The composite and molded matrix materials are preferably thermosetting polymers or thermoplastic polymers. The striking implement, as a whole, should have the desired degree of flexibility and rigidity.

When a FJU is utilized, it serves the function of integrally joining the upper and lower rigid shaft sections, with a SMA element located along the central, longitudinal axis of the shaft. The FJU is preferably (but not necessarily) made of material having high strength, but lower stiffniess than the rigid upper and lower sections and having high vibration dampening properties such as a KEVLAR®-reinforced epoxy composite material. The degree of flexure of the striking implement is controlled by the gap distance, dimensions, heat treatment and composition of the SMA element and diameter of the FJU exposed at the gap.

The SMA element may include alloys of at least some of the following elements: Nickel, Gold, Silver, Cadmium, Indium, Gallium, Manganese, Cobalt, Carbon, Nitrogen, Silicon, Germanium, Tin, Zinc, Niobium, Copper, Iron, Platinum, Thalium, Aluminum, Chromium, Antimony, Carbon, and Titanium. A commercially available, useful SMA is NITINOL®, which is a Titanium-Nickel alloy. More generally, useful SMAs exhibit stress-induced, reversible, austenitic-martensitic phase transformations to exhibit superelastic (reversible strain) properties without permanent deformation at useful strain levels. Dimensional sizing and composition of the SMA unit would preferably allow reversible strain levels up to 6–8% strain without permanent, plastic deformation to allow the striking implement to store and release greater energy than would be possible without the SMA unit over multiple cycles.

Aspects of the invention may be better understood, with reference to the attached figures, which are illustrative of embodiments of the invention and which do not limit the scope of the invention as disclosed and claimed herein. Referring to FIG. 1A, a shaft 2 has an upper portion 4 and a lower portion 6. These two shaft portions are coaxially aligned, with a common longitudinal axis C. A lower end 4a of the upper shaft portion 4 is adjacent the upper end 6a of the lower shaft portion 6, and the ends 4a and 6a are separated from each other by a gap 10, of predetermined size. A shape memory alloy element 8 extends coaxially with the upper and lower shaft sections 4,6 and spans the gap 10 between the shaft portions. An upper end 8a of the shape memory element 8 is surrounded by, and encased in, a polymeric plug 12 which extends to and adheres to an inner surrounding wall 14 of the upper shaft section 4. Likewise, a lower end 8b of the shape memory alloy 8 is encased in and surrounded by a polymeric plug 16 that extends to and adheres to the inner wall 18 of the lower shaft portion 6. The polymeric plugs 12,16 firmly adhere to inner walls 14 and 18 respectively so that when the striking implement is used to strike an object, the plugs are able to hold the shape memory alloy element 8 in place.

Figure 1B:
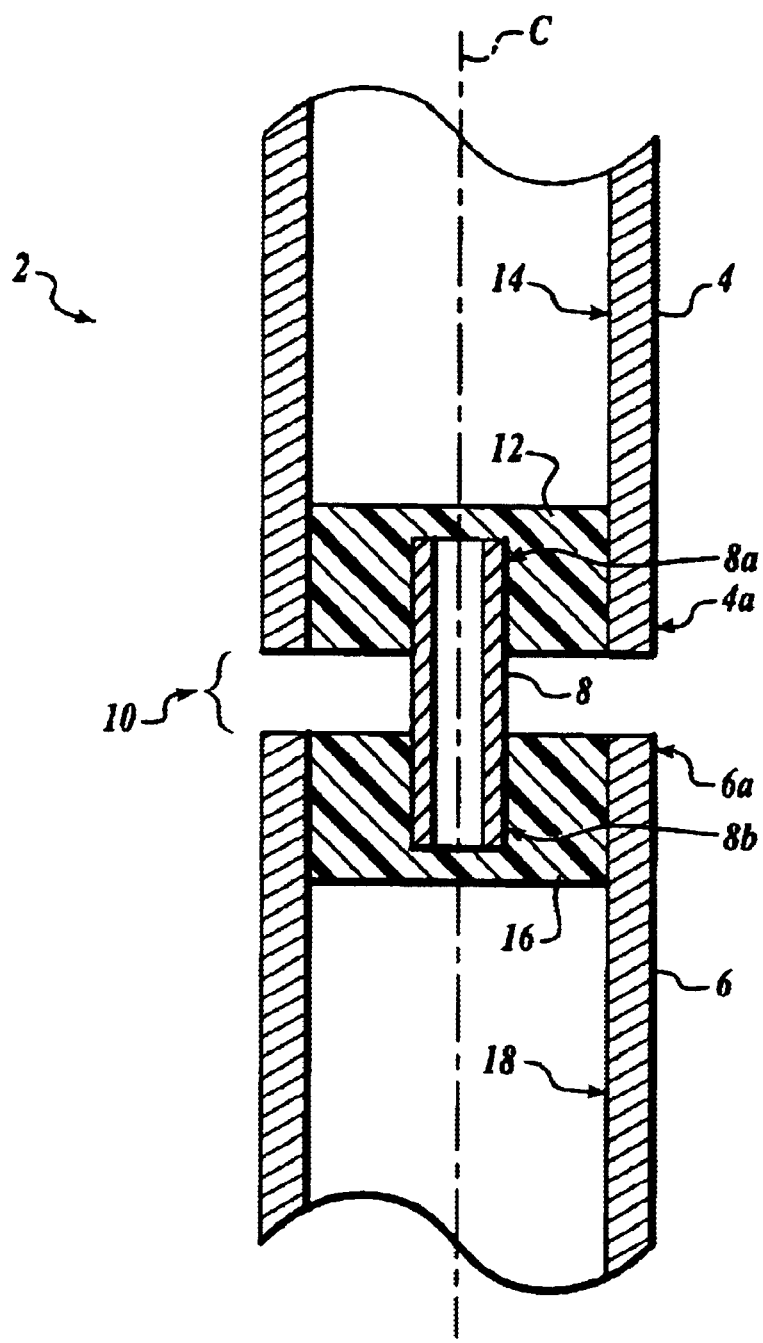
FIG. 1B illustrates a preferred embodiment of the present invention showing SMA wires coaxial with the longitudinal axis of the shaft directly joining upper and lower shaft sections of the striking implement.
Figure 1C:
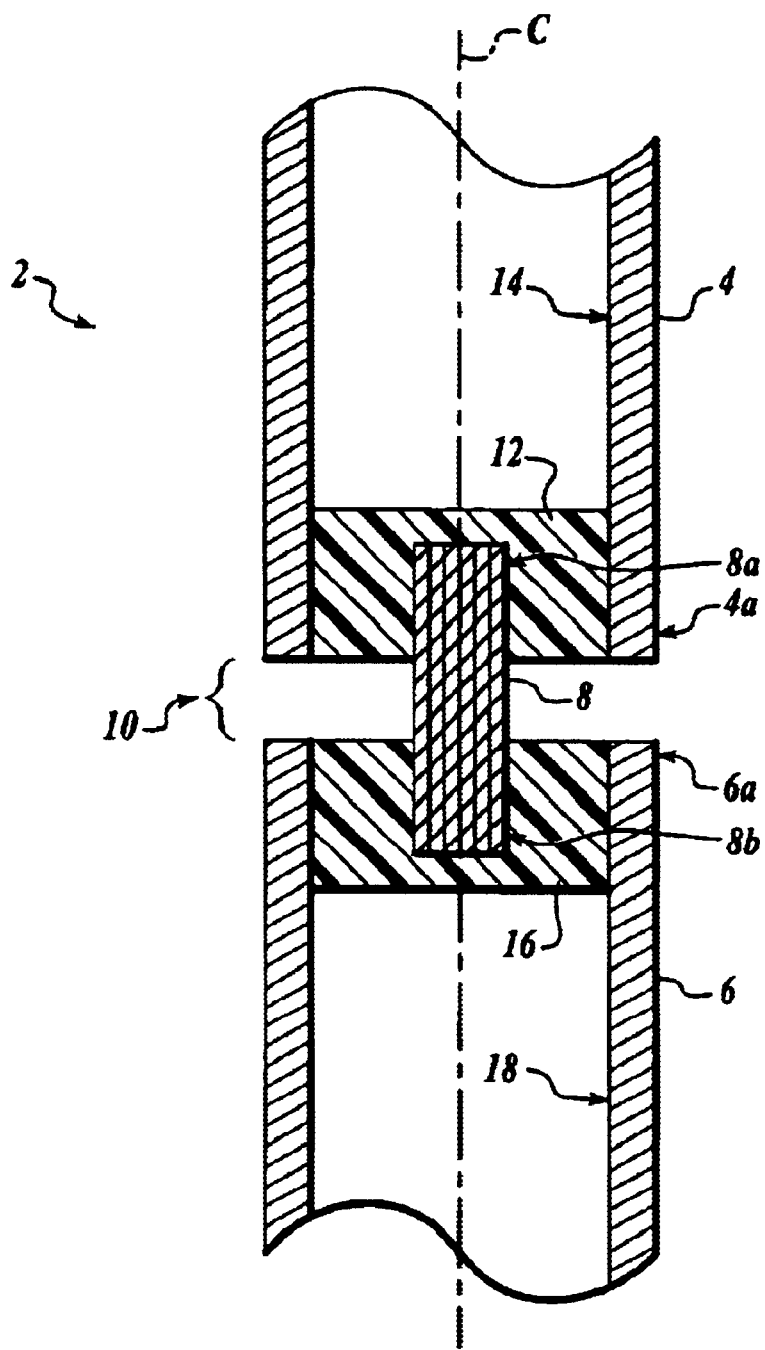
FIG. 1C illustrates a preferred embodiment of the present invention showing a SMA hollow tube coaxial with the longitudinal axis of the shaft directly joining upper and lower shaft sections of the striking implement.

FIG. 1B shows an embodiment of the invention that is substantially similar to FIG. 1A, except that the shape memory alloy element 8 is made up of a bundle of shape memory alloy wires. The embodiment of FIG. 1C is also similar to the embodiment of FIG. 1A, except that the shape memory alloy element 8 is a hollow tube of the alloy composition.

Figure 2:
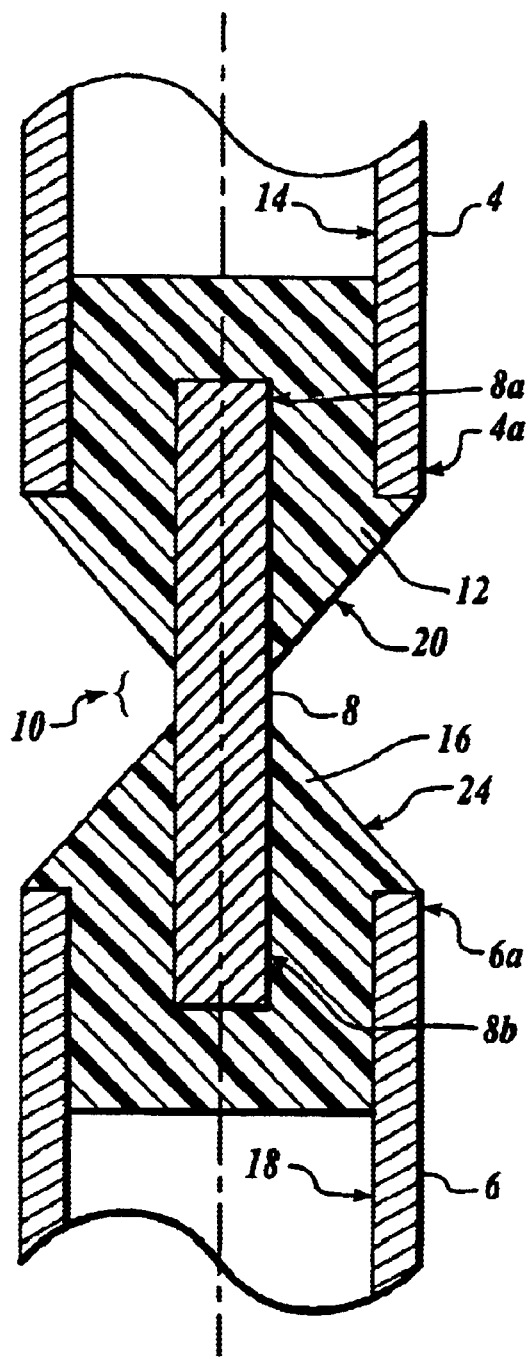
FIG. 2 illustrates another preferred embodiment of the present invention wherein the degree of flexure of the striking implement is controlled by the length and diameter of the SMA element.

FIG. 2 is a schematic illustration of another embodiment of the invention, wherein a shape memory alloy element 8 is aligned coaxially with and between shaft portions 4 and 6, with an upper end 8a encased in a frusto-conical shaped polymeric plug 12, and a lower end 8b encased in a second frusto-conical plug 16. Frusto-conical plug 12 has a base extending into the lower end 4a of upper shaft portion 4, and adhering to inner wall 14. Wall 20 of plug 12 extends from the lower edge 4a of shaft portion 4 and angles inward to the shaft axis to form a cone-shaped plug, with the apex thereof terminating near a central region of the shape memory alloy 8. Likewise, lower frusto-conical plug 16 has inward angled wall 24 extending upward from upper edge 6a of lower shaft portion 6, to terminate near a central region of shape memory alloy 8. In preferred embodiments, there is a gap 10 of predetermined size between the termination points of the upper and lower plug walls to allow the shape memory alloy to flex more readily in the uncovered region.

Figure 3:
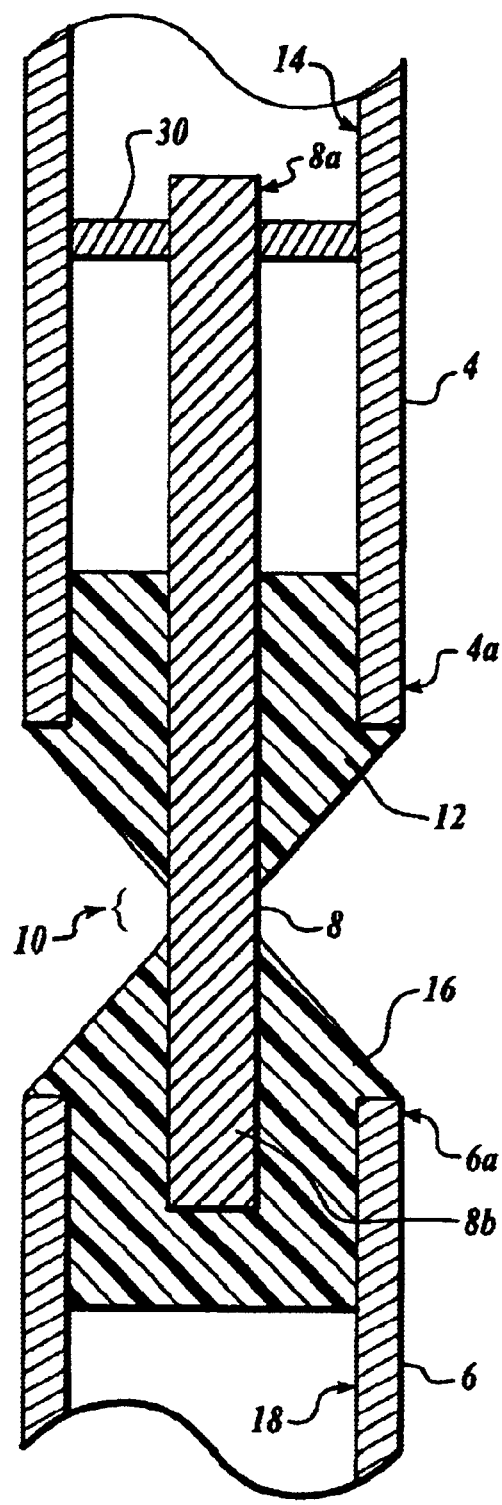
FIG. 3 illustrates another preferred embodiment of the present invention, similar to FIG. 2 with the addition of a collar to maintain the greater length SMA element along the central, longitudinal axis.

FIG. 3 is an illustration of a further embodiment of the invention, utilizing a collar 30 to restrain an upper end 8a of the shape memory alloy 8 within the upper shaft section 4. As can be readily seen, the collar 30 extends from a point of attachment to the upper end 8a of shape memory alloy 8 to the inner wall 14 of upper shaft section 4. Similarly, the lower end 8b of the shape memory alloy may be restrained by a collar extending from lower end 8b to inner wall 18 of lower shaft section 6. The collar may, in one useful embodiment, be an object having an outer rim that fits snugly against inner walls 14,18 and a throughbore for receiving an end of the element 8. In the embodiment of FIG. 3, the shape memory alloy is further restrained in a position coaxially aligned with the upper and lower shaft sections by a couple of polymeric plugs 12,16. These plugs are essentially as described with reference to FIG. 2, although other plugs may also be used.

Figure 4:
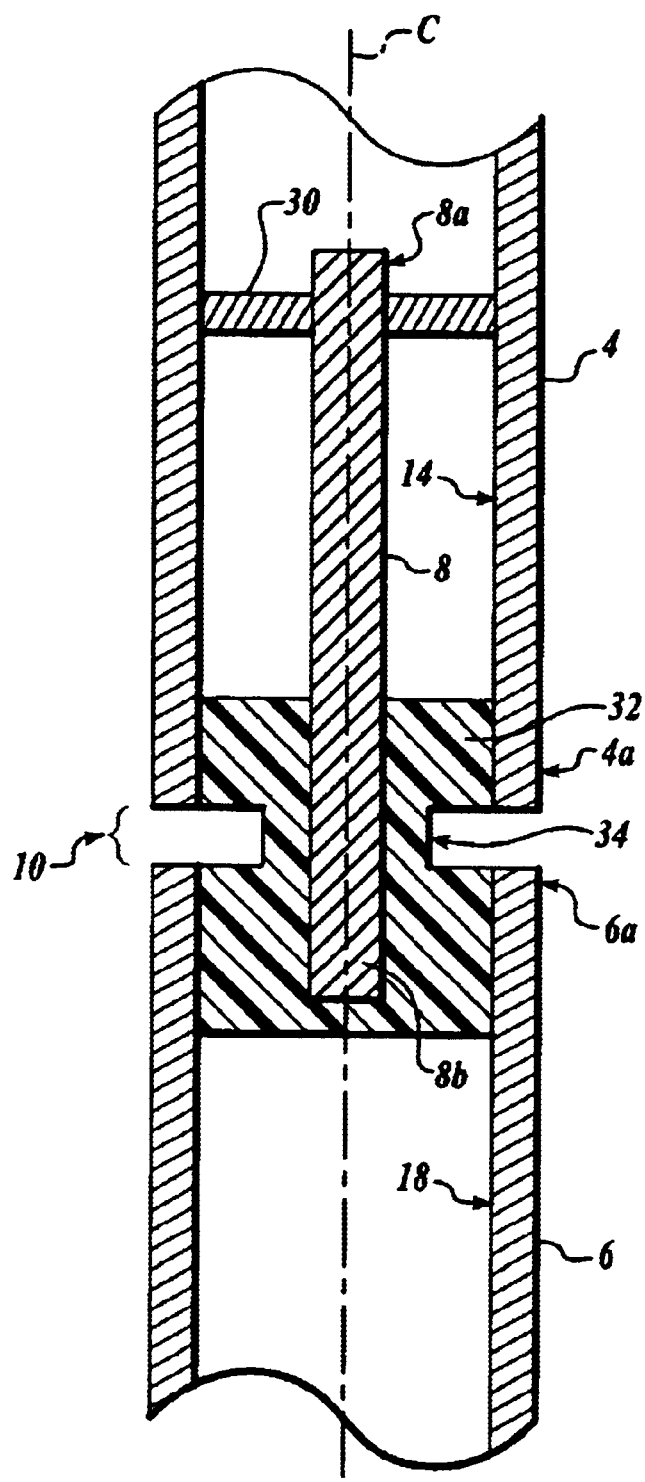
FIG. 4 illustrates another preferred embodiment of the present invention using a flexible joining unit to integrally join the upper and lower shaft sections with a coaxial SMA element.

FIG. 4 illustrates a further embodiment of the invention. In this embodiment, a shape memory alloy 8 is mounted coaxially within the shaft portions 4 and 6. The upper end 8a of the shaft memory element is secured by a collar 30 that extends from the shape memory alloy 8 to an inner wall 14 of the shaft section 4. The lower end 8b of the shape memory alloy element 8 is encased in a flexible joint unit, preferably a plug of fiber reinforced polymer, such as an epoxy resin reinforced with KEVLAR® fibers. The plug 32 is substantially cylindrical, when the shaft is circular in cross-section, and extends from the upper shaft portion 4 into the lower shaft portion 6, spanning the predetermined gap 10, the plug 32 has a circumferential notch 34 to more readily allow flexure of the shaft through the predetermined gap, when the implement is used to strike an object. Thus, the ends 4a,6a are able to move toward each other on one side of the implement when it bends or flexes during use, and away from each other on an opposite side of the implement. Gap size may be determined by the degree of flexure allowed, so that ends of the shaft portions make contact acting as a stop to limit further flexure of the element.

Figure 5:
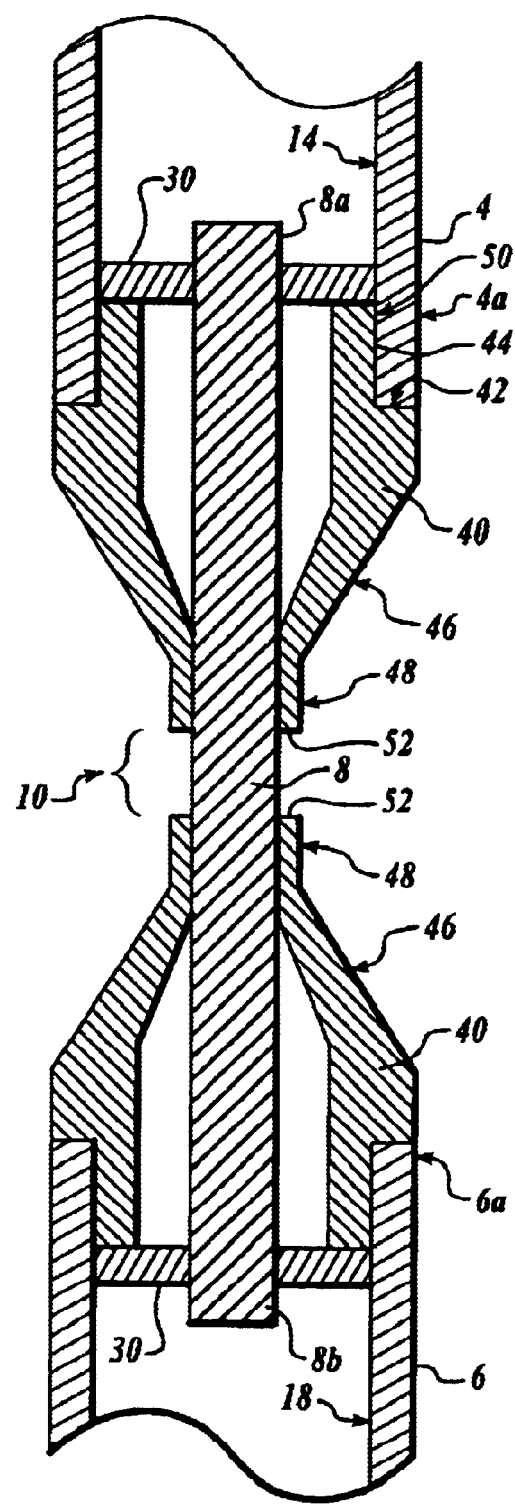
FIG. 5 illustrates another preferred embodiment of the present invention with individual couplers on both the upper and lower rigid shaft sections that couple onto the SMA element to join the upper and lower shaft sections.

FIG. 5 is a cross-sectional view of a further embodiment in accordance with the invention. In this embodiment, each of the upper and lower ends of the coaxially mounted shaped memory alloy element 8 is restrained within a shaft portion by a collar 30. The lower end 4a of upper shaft section 4 is equipped with a frusto-conical shaped coupling 40, and the lower shaft portion 6 is equipped with a matching coupling 40 mounted to its end 6a. The coupling 40 may be fabricated from metal, or an organic polymeric composition, preferably reinforced with a reinforcing filler. The coupler 40 has a frusto-conical shape, with a portion of its upper side walls 44 machined or molded to form a surrounding step 42 that mates with end 4a of the shaft portion 4 and an upper wall 58 with an outside diameter sized to fit against inner wall 14 of the shaft. Thus, the coupling 40 may be screwed onto the shaft portion, or affixed in some other way, such as by use of a suitable adhesive. The cone-shaped portion of the coupling 40 tapers inward toward the longitudinal axes of the shaft, and is bounded by tapering wall 46. Wall 46 terminates in a vertical wall 48 that fits snuggly around the outer surface of shape memory alloy 8. The wall may be screwed onto shape memory alloy 8, or may be otherwise secured to the shape memory alloy, such as by a suitable adhesive. As shown, the upper end 6a of lower shaft portion 6 is equipped with a matching coupling, and there is a gap 10 of predetermined size between terminating ends of terminating vertical walls 48. This embodiment allows secure retention of the shape memory alloy in a substantially coaxial location within the shaft, while permitting ready flexure of shape memory alloy 8 within limits imposed by the gap 10. The terminating ends of walls 48 that form gap 10 act as a stop 52 to prevent over flexure and permanent deformation of the shape memory alloy.

Figure 6:
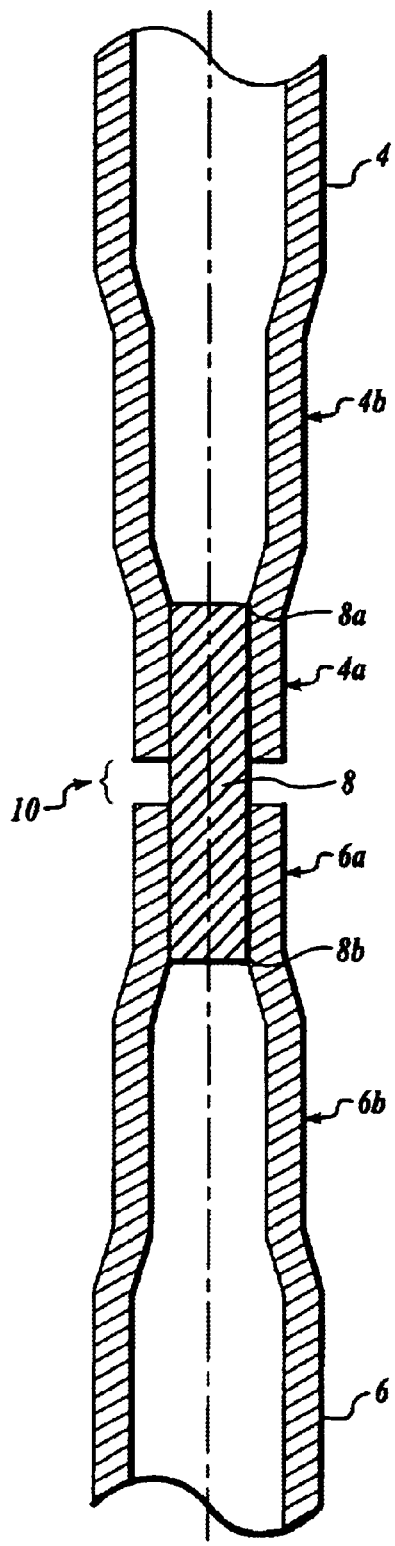
FIG. 6 illustrates yet another preferred embodiment of the present invention wherein the inner diameters of the upper and lower rigid shaft sections are tapered to receive and couple with the outer diameter of the SMA element to join the two shaft sections together.

FIG. 6 is a schematic illustration of a yet further embodiment in accordance with the invention. In this embodiment, each of the shaft portions 4,6 have tapered ends with the shape memory alloy bridging a gap between the terminal ends. In the illustrated example, the walls of upper shaft portion 4 taper inward in a first step to form shaft portion 4b, with a smaller inside diameter and outside diameter than shaft section 4 as a whole. Shaft portion 4a in turn tapers inward from shaft portion 4b, and has a smaller inner and outer diameter than shaft portion 4b. Shaft portion 4a has an inside diameter that allows tightly securing a shape memory alloy element 8 within an inner wall thereof. Shape memory alloy 8 may be held in place by threads cooperating with threads on the inner wall of shaft portion 4a, or by a suitable adhesive, or by other means, such as a pin penetrating the walls of the shaft and the alloy element. Additionally, the shape memory property of the SMA may be exploited whereby the SMA's outer diameter is slightly greater than the inner diameters of the shaft at the implement's use temperature range. The SMA and shaft ends are joined by cooling the SMA to transform it to its softer martensitic state and subsequently inserting the SMA into each shaft end. At the use temperature, the SMA reverts to its austenitic state, expanding its outer diameter and thereby is joined to the shaft ends by the induced stress of dimensional mismatch. Likewise, the lower section of alloy element 8 is held within inner walls of lower shaft portion 6a, that is tapered relative to shaft portion 6b, and the shaft section 6.

In the specification and claims, the term "frusto-conical" means a shape in the approximate form of a portion of a cone, having the apex removed. While a cone is circular in cross-section, transverse to its vertical axis, it is recognized that some of the striking implement shafts to which the invention pertains are not of precisely circular cross-section. Accordingly, in the specification and claims, the term frusto-conical should be more broadly interpreted to include a shape that can be mated with all those shafts that taper and that may have cross-sectional areas that approximates a circular shape, such as elliptical shapes, hexagonal shapes, and the like. Other shafts, such as the shaft of an ice hockey stick, may not taper and may have a cross-sectional area that more closely resembles a rectangle, with rounded ends. A plug mating with these also falls within the ambit of the term "frusto-conical", as used herein. While the above descriptions of embodiments shown in the figures may relate to shafts with circular cross-sections, this is mainly for the sake of brevity and it is clear that the descriptions may also apply to shafts with other cross-sectional shapes.

Typical length of a shape memory element would range from about 0.5 to about 6 inches, thickness or diameter from about 0.100 to about 0.400 inches and for tubular forms, wall thickness from about 0.020 to about 0.250 all of which depend on the final implement application.

Figure 7A:
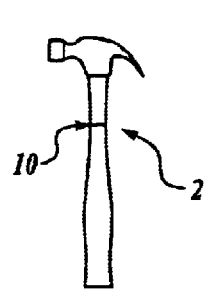
FIGS. 7A, B, C, D, E, F, and G, illustrate examples of striking implements
Figure 7B:
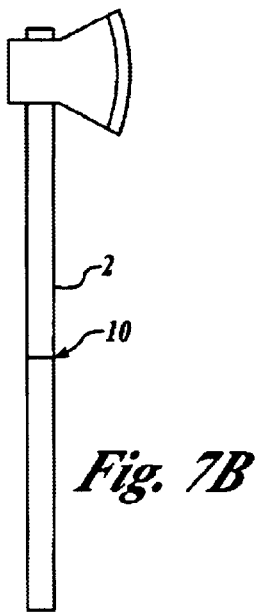
Figure 7C:
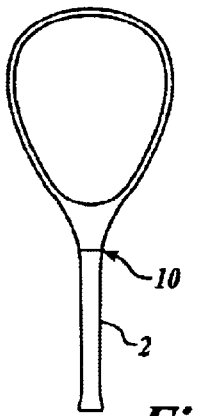
Figure 7D:
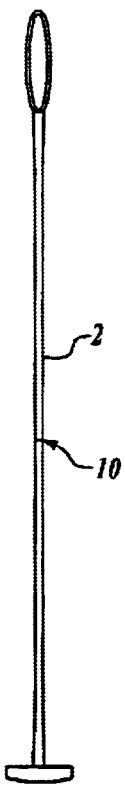
Figure 7E:
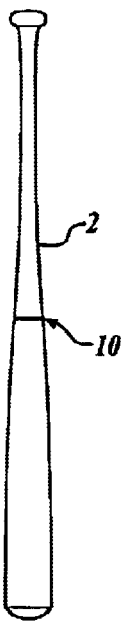
Figure 7F:
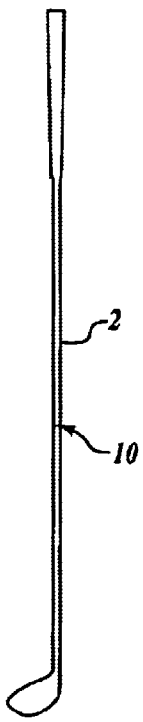
Figure 7G:
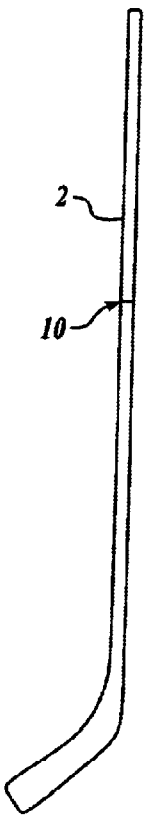
Figure 8:
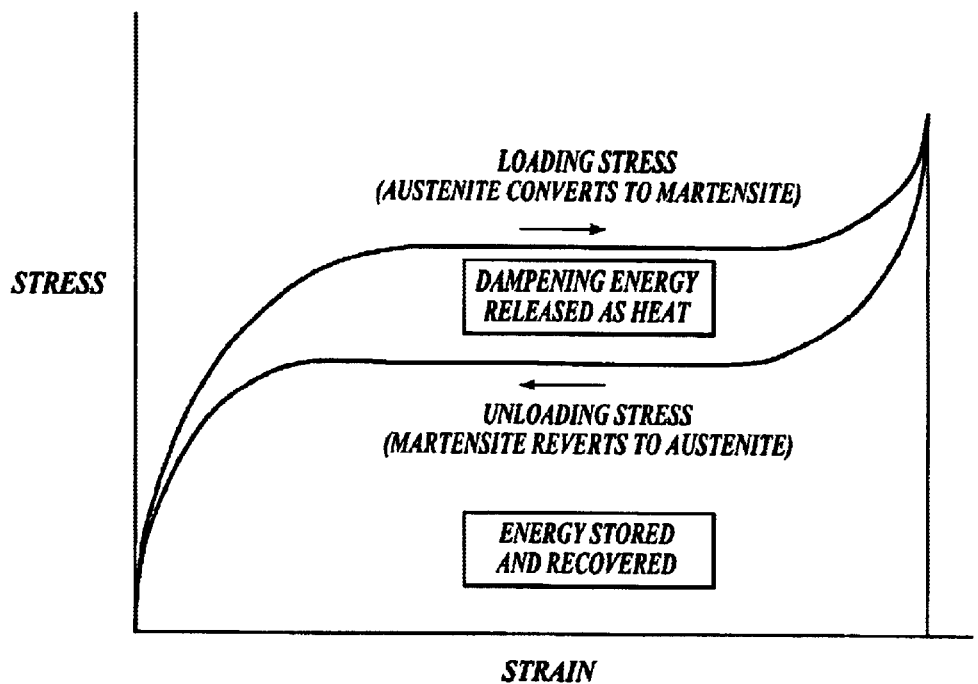
FIG. 8 illustrates a stress strain curve chart in accordance with the preferred embodiment.

The invention may be usefully employed in, for example the implements of FIGS. 7A–G, among others. FIG. 7A is a hammer, 7B is an axe, 7C is a sports racket, 7D is a polo club, 7E is a baseball bat, 7F is a golf club, and 7G is a hockey stick. The point of insertion of the shape memory alloy is schematically shown at shaft point 10 on each implement shaft 2.

The above specification provides a description of the preferred embodiments of the invention and does not limit the scope of the invention. Since many embodiments of the invention can be made, without departing from the spirit and scope of the invention, the invention resides in the claims hereinafter appended.

I claim:

1. A striking implement having improved energy storage and release capability, and vibration dampening, and having a flex point location, the implement comprising a shaft extending from a first end adapted for being grasped by a human hand to a second end affixed to an impactor for striking an object, the implement comprising:

an element comprised of a shape memory alloy material located at the flex point, the element extending coaxially along a portion of the shaft and flexing when a user strikes an object with the implement, wherein the shape memory alloy material has super-elastic properties and undergoes martensitic phase transformation to absorb forces generated when the impactor is employed to strike the object; and wherein the shape memory alloy element has an elongate shape with an upper end and a lower end, the upper end of the element extending to within a first portion of the shaft, and the lower end of the element extending to within a second portion of the shaft, with a gap of predetermined size between the portions of the shaft.

2. The implement of claim 1, wherein the striking implement is selected from the group consisting of golf clubs, baseball bats, polo clubs, tennis racquets, squash racquets, racquet ball racquets, ice hockey sticks, vaulting poles, picks, hammers, and axes.

3. The implement of claim 1, wherein the shape memory alloy element is in the form of a hollow substantially cylindrical tube.

4. The implement of claim 1, wherein the shape memory alloy element comprises a solid plug of the alloy.

5. The implement of claim 4, wherein the solid plug is in the form of a substantially solid cylinder-shaped plug.

6. The implement of claim 1, wherein the shape memory alloy element is dimensionally sized such that when stressed during flexure, a stress level of the element is proximate a threshold of a pseudo-elastic region of a stress-strain property curve of the element.

7. The implement of claim 1, wherein the shape memory alloy element is in an austenitic phase at a temperature at which the implement is used.

8. The implement of claim 1, wherein the shape memory alloy element is affixed to the ends of the shaft with a composition composing an organic polymer.

9. The implement of claim 8, wherein the composition comprises a composite of epoxy resin and aramid fibers.

10. The implement of claim 9, wherein the composition is in the form of a substantially conical shaped plug, a substantially conical shaped plug extending from each of the upper end of the lower shaft portion and lower end of the upper shaft portion toward a central region of the shape memory alloy element and at least partially surrounding the element.

11. The implement of claim 1, wherein an upper end of the shape memory alloy element is restrained within the first portion of the shaft by a collar extending between the element and an inner wall of the shaft.

12. The implement of claim 1, wherein one end of the shape memory alloy element is restrained inside one of the shaft portions by a collar extending from the element to a wall of the one shaft portion; and an opposite end of the element is encased in a polymeric plug, the plug forming a bridge between ends of the first and second shaft portions.

13. The implement of claim 1, wherein an upper end of the element is restrained substantially immovable within the first shaft portion, and the lower end of the element is mounted substantially immovable within the second shaft portion.

14. The implement of claim 13, wherein an end of each of the first and second shaft portions, respectively, have affixed thereto a coupling, each coupling mounted to an end of the respective shaft portion, to a second end tapering inward to surround an outer surface of the shape memory alloy element proximate a center of the element, the second ends of the couplings spaced apart by a predetermined distance.

15. The implement of claim 1, wherein an upper end of the shape memory alloy element is contained within a wall of the first shaft portion and a lower end of the element is contained within a wall of the second shaft portion, a central portion of the element is not contained within walls of the shaft and the central portion flexes when the implement is used to strike an object.

16. The implement of claim 15, wherein the upper end of the shape memory alloy element is at least partially encased in a polymeric plug, the plug adhering to an inner wall of the first shaft portion.

17. The implement of claim 15, wherein the lower end of the shape memory alloy element is at least partially encased in a plug, the plug adhering to an inner wall of the second shaft portion.

18. The implement of claim 1, wherein the element comprises a bundle of wires.

19. A shaft of a striking implement comprising:
(a) a first shaft portion having a first end;
(b) a second shaft portion having a second end, the second end and the first end separated by a gap of predetermined size; and
(c) a shape memory alloy element spanning the predetermined gap and extending from the first shaft portion to the second shaft portion, wherein the shape memory alloy element has super-elastic properties and undergoes an austensitic to martensitic phase transformation under flexure to dampen vibrations generated when the striking implement is employed to strike an object.

20. The shaft of claim 19, wherein the shape memory alloy element is elongate, with a longitudinal axis aligned with a longitudinal axis of the shaft.

21. The shaft of claim 19, wherein the shape memory alloy element comprises a first end surrounded by a polymeric plug, the plug affixed to an inner wall of the first shaft portion.

22. The shaft of claim 21, wherein the polymeric plug is substantially cylindrical.

23. The shaft of claim 21, wherein the polymeric plug is frusto-conically shape.

24. The shaft of claim 19, wherein the shape memory alloy element has a first end contained within an inner surrounding wall of the first shaft portion, the first end restrained by a collar extending from the element to an inner wall of the first shaft portion.

25. The shaft of claim 24, wherein the shape memory alloy element comprises a second end, the second end at least partially encased in a polymeric plug, the plug adhered to an inner wall of the second shaft portion.

26. The shaft of claim 25, wherein the plug adheres to the inner wall of the first shaft portion, and spans the gap between the two shaft portions.

27. The shaft of claim 26, wherein a portion of the plug spanning the gap comprises a circumferential notch adjacent the gap between the first and second shaft portions.

28. The shaft of claim 19, wherein the shape memory alloy element comprises a second end, the second end at least partially encased in a polymeric plug, the plug adhered to an inner wall of the second shaft portion.

29. The shaft of claim 28, wherein the plug adheres to the inner wall of the first shaft portion, and spans the gap between the two shaft portions.

30. The shaft of claim 29, wherein a portion of the plug spanning the gap comprises a circumferential notch, the notch located in the gap between the first and second shaft portions.

31. The shaft of claim 19, further comprising: a frusto-conical shaped first coupling mounted to the first end of the first shaft portion; and a frusto-conical shaped second coupling mounted to the second end of the second shaft portion; apexes of the couplings surrounding the shape memory alloy element.

32. The shaft of claim 31, wherein the first end of the element is restrained within the first shaft portion by a collar extending to an inner wall of the shaft.

33. The shaft of claim 19, wherein the shaft portion ends are tapered, the element extending coaxially with the shaft portions and held within tapered ends of the shafts.

34. The shaft of claim 33, wherein the tapered ends are adhered to the element.

35. The shaft of claim 33, wherein the tapered ends hold the element by friction.

36. A striking implement comprising a shaft, the shaft comprising:
(a) a first shaft portion having a longitudinal axis and a first end;
(b) a second shaft portion having a longitudinal axis and a second end;
(c) a shape memory alloy element intermediate the first and second shaft portions, the alloy having a longitudinal axis coincident with longitudinal axes of the first and second shaft portions, the element bridging a gap between ends of the shaft portions; and
(d) a stop, the stop limiting flexure of the element, when the implement strikes an object, to an amount less than would result in permanent deformation of the element, wherein the shape memory alloy element has super-elastic properties and undergoes an austensitic to martensitic phase transformation under flexure to dampen vibrations generated when the implement is employed to strike the object.

37. The implement of claim 36, wherein the shape memory element comprises a first end surrounded by a polymeric plug, the plug affixed to an inner wall of the first shaft portion.

38. The implement of claim 37, wherein the polymeric plug is substantially cylindrical in shape.

39. The implement of claim 37, wherein the polymeric plug is frusto-conical in shape.

40. The implement of claim 36, wherein the shape memory alloy element has a first end surrounded by an inner wall of the first shaft portion, the first end restrained by a collar extending from the element to an inner wall of the shaft portion.

41. The implement of claim 40, wherein the shape memory alloy element comprises a second end, the second end at least partially encased in a polymeric plug, the plug adhered to an inner wall of the second shaft portion.

42. The implement of claim 41, wherein a portion of the plug spans the gap and the plug comprises a circumferential notch adjacent the gap, between the first and second shaft portions.

43. The implement of claim 36, further comprising: a frusto-conical shaped first coupling mounted to the first end of the first shaft portion; and a frusto-conical shaped second coupling mounted to the second end of the second shaft portion; apexes of the couplings surrounding the shape memory alloy element.

\* \* \* \* \*